US012726565B2

(12) United States Patent
Kolhe et al.

(10) Patent No.: US 12,726,565 B2
(45) Date of Patent: Sep. 1, 2026

(54) DERIVING UPDATES TO AN EMERGENCY USER PROFILE FROM COMMUNICATIONS ASSOCIATED WITH AN EMERGENCY INCIDENT

(71) Applicant: MOTOROLA SOLUTIONS, INC., Chicago, IL (US)

(72) Inventors: Prajakta A Kolhe, Barrington, IL (US); Sally B Lopez, West Dundee, IL (US); Srividya G Subramanyam, South Barrington, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 208 days.

(21) Appl. No.: 18/392,030

(22) Filed: Dec. 21, 2023

(65) Prior Publication Data

US 2025/0211672 A1 Jun. 26, 2025

(51) Int. Cl.
*H04M 3/22* (2006.01)
*H04M 11/04* (2006.01)
*G06F 40/174* (2020.01)

(52) U.S. Cl.
CPC ......... *H04M 3/2218* (2013.01); *H04M 11/04* (2013.01); *G06F 40/174* (2020.01)

(58) Field of Classification Search
CPC ............... H04M 3/2218; H04M 11/04; H04M 3/42068; H04M 3/42221; H04M 1/72457; H04M 15/83; G06F 40/174; G06F 16/23; G06F 8/65
See application file for complete search history.

(56) References Cited

U.S. PATENT DOCUMENTS

| | | | | |
|---|---|---|---|---|
| 8,165,562 | B2 | 4/2012 | Piett et al. | |
| 9,374,698 | B2 * | 6/2016 | Ahmed | H04W 4/02 |
| 10,264,121 | B2 * | 4/2019 | Reddy | G10L 15/26 |
| 10,992,805 | B1 * | 4/2021 | Johnson | H04M 3/5116 |
| 11,558,507 | B1 * | 1/2023 | Anderson | H04M 3/5116 |
| 2009/0136006 | A1 | 5/2009 | Milton et al. | |
| 2012/0258680 | A1 | 10/2012 | Piett et al. | |
| 2019/0068784 | A1 * | 2/2019 | Reddy | H04M 3/5116 |
| 2019/0325288 | A1 * | 10/2019 | Oyenan | G06N 3/006 |
| 2021/0383918 | A1 * | 12/2021 | Martin | G06F 16/909 |
| 2023/0370548 | A1 * | 11/2023 | Kucharski | G06Q 10/00 |

* cited by examiner

*Primary Examiner* — Akelaw Teshale

(57) ABSTRACT

When an emergency service provider receives a call, the emergency service provider determines that the caller has an emergency user profile in an emergency service information system configured to release user profile data for a given caller to the emergency service provider when the given caller places an emergency call. Based on this determination, the emergency service provider uses a transcript of the call to identify inconsistencies between information in the transcript and information in the caller's emergency user profile, and the emergency service provider automatically sends a request to the caller to update their user profile along with an indication of the identified inconsistencies from the transcript. Upon receiving authorization from the caller, the emergency service provider updates the caller's user profile using the information identified from the transcript.

20 Claims, 6 Drawing Sheets

500

| | |
|---|---|
| CALL TAKER: | 9-1-1, WHERE'S YOUR EMERGENCY? |
| CALLER: | 355 MAIN STREET, BETWEEN MAPLE AND CEDAR AVENUES. |
| CALL TAKER: | AND WHAT'S THE NATURE OF THE EMERGENCY? |
| CALLER: | MY HOME IS ON FIRE. WE'VE ALL EVACUATED TO A SAFE AREA, BUT MY HUSBAND HAS INHALED A LOT OF SMOKE |
| CALL TAKER: | HAS ANYONE ELSE BEEN INJURED? |
| CALLER: | NO. |
| CALL TAKER. | IS YOUR HUSBAND BREATHING? |
| CALLER: | YES. |
| CALL TAKER: | IS HE CONSCIOUS? |
| CALLER: | YES. |
| CALL TAKER: | OKAY, HELP IS ON THE WAY. CAN I GET YOUR FIRST AND LAST NAME? |
| CALLER: | MING HUO. |
| CALL TAKER: | HOW DO YOU SPELL YOUR LAST NAME? |
| CALLER: | H-U-O. |
| CALL TAKER: | AND YOUR HUSBAND'S FIRST AND LAST NAME? |
| CALLER. | STEPHEN HUO. |
| CALL TAKER: | THANK YOU, MING. PLEASE STAY ON THE LINE UNTIL HELP ARRIVES. |

*FIG. 5*

DERIVING UPDATES TO AN EMERGENCY USER PROFILE FROM COMMUNICATIONS ASSOCIATED WITH AN EMERGENCY INCIDENT

BACKGROUND

Call-takers at public safety answering points (PSAPs), or 9-1-1 emergency call centers (sometimes designated in other countries as 1-1-2, 9-9-9, and the like) collect contextual information from callers regarding emergency incidents, such as location, type of incident, and other details that can assist first responders in responding quickly to incidents.

BRIEF DESCRIPTION OF THE DRAWINGS

FIG. 5 illustrates a transcript of an emergency call, according to some examples.

Figure 1:
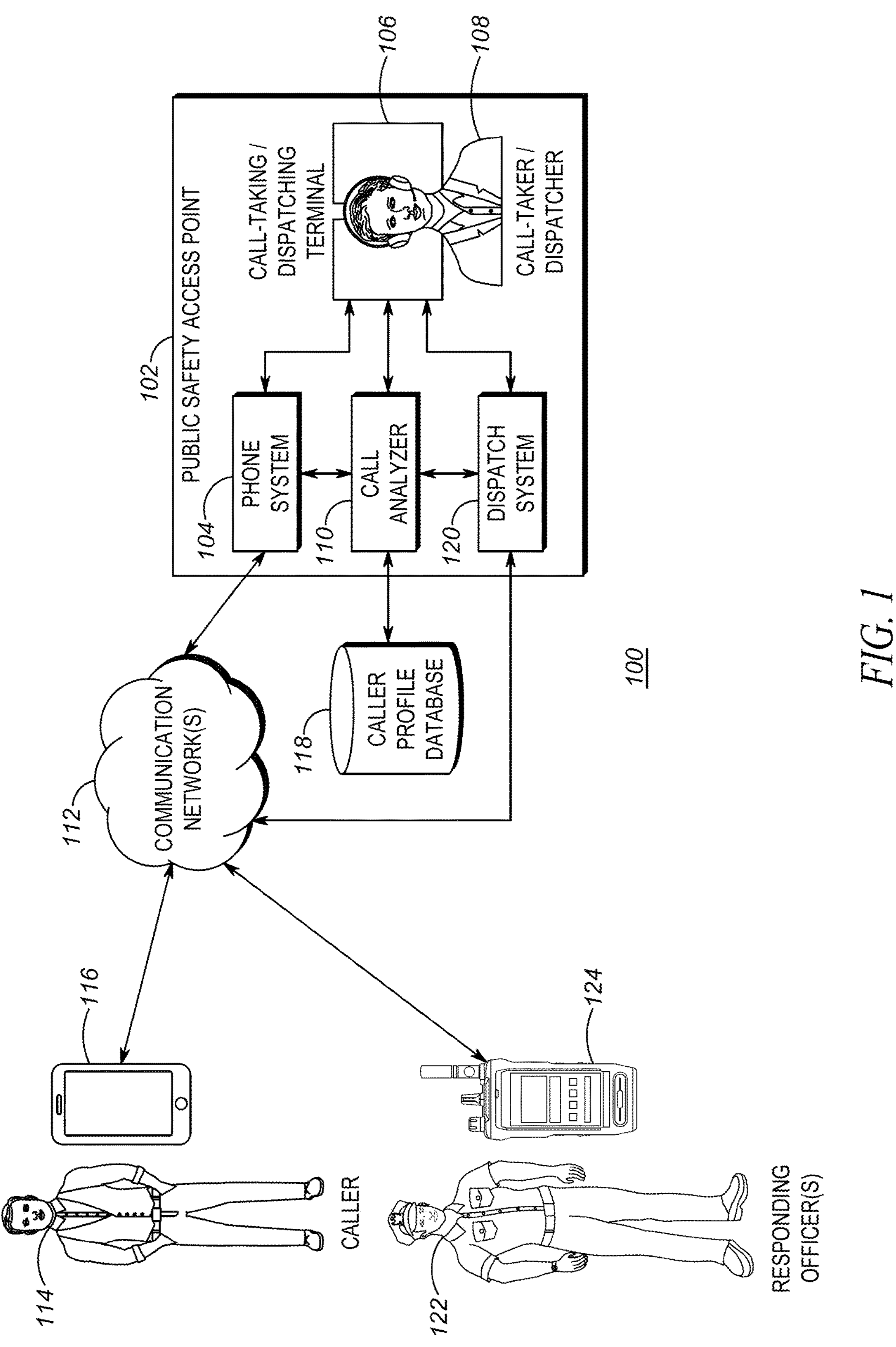
FIG. 1 illustrates a public safety communication system, according to some examples.

Skilled artisans will appreciate that elements in the figures are illustrated for simplicity and clarity and have not necessarily been drawn to scale. For example, the dimensions of some of the elements in the figures may be exaggerated relative to other elements to help improve understanding of examples of the present disclosure.

The system, apparatus, and method components have been represented where appropriate by conventional symbols in the drawings, showing only those specific details that are pertinent to understanding the examples of the present disclosure so as not to obscure the disclosure with details that will be readily apparent to those of ordinary skill in the art having the benefit of the description herein.

DETAILED DESCRIPTION

Call-takers at public safety answering points (PSAPs) that receive emergency calls prompt questions to the caller to gain a contextual understanding of an incident so that first responders can be accurately and efficiently dispatched to the incident. In some instances, acquiring sufficient information and accurate information from a caller can be a time consuming process during an emergency. Call-takers may not know what information to ask for, and, depending on the emergency, callers may have trouble responding to questions and recalling information. In addition to contextual information relating to an incident (e.g., medical conditions of the caller, medications of the caller, type of incident, etc.), first responders may require instructions on how to access the caller's exact location, such as, for example, building access codes or the like. Further, callers may want certain individuals (e.g., emergency contacts, neighbors, employers, building receptionists, etc.) to be notified of the emergency incident.

To assist with this call handling process, some PSAPs interface with an emergency information system through which, prior to placing an emergency call, an individual may create an emergency user profile containing personal information such as medical conditions, medications, health data, emergency contacts, and the like that is stored in a database. Then, when the individual places an emergency call at a later time, the information in their emergency user profile is automatically provided to a call-taker at a PSAP. However, over time, the information in any given emergency user profile may become out of date for various reasons. For instance, an individual may move to a new address, start taking new medications, change their physical appearance, change their name, or change their household members (e.g., by moving in with a partner, having children, or getting a new pet). And when such details change for an individual, they may forget or neglect to update such information in their emergency user profile. Consequently, when this individual places an emergency call without having updated their emergency user profile in advance, the PSAP call-takers may be unable to rely on the information in the user profile and may instead have to manually question the caller for a larger amount of information, which could slow down the call-taking and dispatch processes.

Thus, there is a need for improved mechanisms for enabling and assisting individuals with maintaining their existing emergency user profiles in an emergency information system. One example provides a method involving: (i) determining that an emergency service provider has received a call from a communication device of a caller; (ii) generating a transcript of the received call; (iii) determining that the caller is associated with a user profile in an emergency service information system, where the user profile comprises user data characterizing the caller, and where the user data becomes accessible to the emergency service provider based on the emergency service provider receiving the call from the communication device of the caller; (iv) comparing information in the transcript of the received call to the user data characterizing the caller in the emergency information system, (v) based on the comparison, identifying one or more inconsistencies between the information in the transcript and the user data characterizing the user in the emergency information system; (vi) sending, to the communication device of the caller, a request to update the user profile associated with the caller in the emergency information system, the request including an indication of the identified one or more inconsistencies; (vii) receiving, from the communication device of the caller, an authorization to update the user profile associated with the caller in the emergency information system, and (viii) updating the user data characterizing the caller in the emergency information system to be consistent with the information in the transcript of the received call.

In some aspects of the method, comparing information in the transcript of the received call to the user data characterizing the caller in the emergency information system involves: (i) determining a set of fillable fields for a user profile in the emergency information system; (ii) determining, based on a context of a particular term or phrase in the transcript, that the particular or term or phrase corresponds to a particular fillable field of the set of fillable fields; and (iii) responsively comparing the particular term or phrase in the transcript to the user data in the particular fillable field. And in some aspects of the method, the indication of the identified one or more inconsistencies includes an indication of the particular fillable field and the particular term or phrase in the transcript. Further, in some aspects of the method, identifying one or more inconsistencies between the information in the transcript and the user data characterizing the user in the emergency information system involves determining that the particular term or phrase in the transcript differs from the user data in the particular fillable field.

In some aspects of the method, the indication of the identified one or more inconsistencies comprises a copy of the transcript having the identified one or more inconsistencies in the transcript formatted differently from any remaining transcript text to visually distinguish the identified one or more inconsistencies from the remaining transcript text.

In some aspects of the method, the method further involves: (i) obtaining a transcript of communications by a responding officer dispatched in response to the received call; (ii) identifying, from the transcript of communications by the responding officer, an additional one or more inconsistencies between information in the transcript of communications by the responding officer and the user data characterizing the user in the emergency information system, wherein the request to create the user profile of the caller further includes an indication of the additional one or more inconsistencies; and (iii) updating the user data characterizing the caller in the emergency information system to be consistent with the information in the transcript of communications by the responding officer.

In some aspects of the method, the method further involves: (i) identifying, from the transcript of the received call, information about an individual different from the caller; (ii) determining, based on the identified information of the different individual, that the different individual is associated with a different user profile comprising user data characterizing the different individual in the emergency service information system; (iii) comparing information in the transcript of the received call to the user data characterizing the different individual in the emergency information system; (iv) based on the comparison, identifying one or more inconsistencies between the information in the transcript and the user data characterizing the different individual in the emergency information system; (v) determining a communication device of the different individual; and (vi) sending, to the communication device of the different individual, a request to update the user profile associated with the different individual in the emergency information system, the request including an indication of the identified one or more inconsistencies between the information in the transcript and the user data characterizing the different individual in the emergency information system. And in some aspects of the method, determining the communication device of the different individual involves: (i) sending, to the communication device of the caller, a request for information identifying the communication device of the different individual; and (ii) receiving, from the communication device of the caller, information identifying the communication device of the different individual.

In some aspects of the method, sending, to the communication device of the caller, the request to update the user profile associated with the caller in the emergency information system involves: (i) determining a priority level associated with the received call; and (ii) delaying sending the request to update the user profile by a particular amount of time, where the particular amount of time depends on the priority level associated with the received call.

Another example provides a computing device having at least one processor and a non-transitory computer-readable storage medium comprising program instructions that, when executed by the at least one processor, cause the computing device to perform any or all aspects of the example method described above.

Still another example provides a non-transitory computer-readable storage medium comprising program instructions that, when executed by at least one processor, cause a computing device to perform any or all aspects of the example method described above.

Each of the above-mentioned examples will be discussed in more detail below, starting with example system and device architectures of the system in which the examples may be practiced, followed by an illustration of processing blocks for achieving an improved technical method, device, and system for deriving updates to an emergency user profile from a transcript of an emergency call.

Examples are herein described with reference to flowchart illustrations and/or block diagrams of methods, apparatus (systems and devices), and computer program products according to examples. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the operations specified in the flowchart and/or block diagram block or blocks. The methods and processes set forth herein need not, in some examples, be performed in the exact sequence as shown and, where possible, various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (Saas), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or example discussed in this specification can be implemented or combined with any part of any other aspect or example discussed in this specification.

Further advantages and features consistent with this disclosure will be set forth in the following detailed description, with reference to the figures.

Referring now to the drawings, FIG. 1 illustrates an example public safety communications system 100. It should be understood that the system 100 is provided as one example and, in some instances, the system 100 may include fewer or additional components than those illustrated. As would be understood by one skilled in the art, FIG. 1 is a simplified diagram and, in practice, public safety communication systems can be more complex than the schematic elements depicted in FIG. 1.

In the illustrated example, the system 100 includes PSAP 102 (for example, an emergency call center) having a phone system 104, a call-taking/dispatching terminal 106, a call-taker/dispatcher 108 associated with the call-taking/dispatching terminal 106, and a call analyzer device 110. While illustrated for simplicity as including a single call-taking/dispatching terminal 106 and call-taker/dispatcher 108, it should be understood that the PSAP 102 may include multiple call-taking/dispatching terminals 106 and multiple call-takers/dispatchers 108. Further, in some examples of the PSAP 102, the call-taking and dispatching functions may be performed by disparate systems, such that the PSAP 102 includes separate call-taking and dispatching terminals as well as separate call-takers and dispatchers that interface with such terminals. Additionally, while illustrated for simplicity as a single call analyzer device 110 residing at the PSAP 102, the call analyzer device 110 may alternatively be implemented in a distributed manner at the PSAP 102. In some instances, the call analyzer device 110 is implemented in whole or in part by a cloud computing environment accessible by the PSAP 102.

The PSAP 102 is communicatively connected to a communication network 112 and performs, among other things, computer aided dispatch (CAD) operations to provide emergency services to callers, such as the caller 114 illustrated in FIG. 1. The call-taking/dispatching terminal 106 includes, among other things, a processor (for example, a microprocessor or another suitable programmable device), a memory (i.e., a computer-readable storage medium), and one or more input devices, output devices, or input and output devices including, for example, one or more displays, keyboards, keypads, mice, joysticks, touchscreens, speakers, microphones, and/or headsets. Various other components of the PSAP 102, such as the phone system 104 and the dispatch system 120 can similarly include a processor and a memory storing program instructions executable by the processor to perform the operations described herein.

The components of the PSAP 102 are communicatively coupled using one or more wired and/or wireless networks. A call-taker/dispatcher 108 interacts with the call-taking/dispatching terminal 106 to answer communications, including emergency calls (e.g., 9-1-1 calls) made to and received at the PSAP 102. For example, a caller 114, using a communication device 116 (e.g., a telephone, a smart telephone, a tablet computer, or another similar device capable of operating as described herein) places an emergency call using the communication network(s) 112 (e.g., a cellular network, the public switched telephone network, the Internet, or another suitable network), and the call is routed to the PSAP 102.

The phone system 104 routes calls received from callers, such as the caller 114, over the communication network(s) 112 to the call-taking/dispatching terminal 106 so that the call-taker/dispatcher 108 may respond to the call. The call may be a voice-based call (e.g., a telephone call, a video call including audio, an audio recording sent via text-to-9-1-1, etc.) or a text-based call (e.g., a multimedia messaging service (MMS) message, a short message service (SMS) message, a real-time text (RTT) message, etc.).

In addition to routing the call to the call-taker/dispatcher 108 via the call-taking/dispatching terminal 106, the phone system 104 provides call content and other information associated with the call (e.g., a phone number of the caller 114, a caller ID of the caller 114, a location of the caller 114, and/or the like) to the call analyzer device 110. The call analyzer device 110 is configured to analyze the call content and other information associated with the call and to perform various functions based on the performed analyses. For example, as explained in further detail below, the call analyzer device 110 can be configured to perform speech recognition with respect to the call content (e.g., using a natural language model or the like) and generate a transcript of the call. Additionally, the call analyzer device 110 can access a caller profile database 118 storing user profiles associated with registered users and can use the information associated with the call to query the caller profile database 118 for an emergency user profile of the caller.

The caller profile database 118 may be a database housed on a suitable database server communicatively coupled to and accessible by the call analyzer device 110. In some examples, the database 118 may be part of a cloud-based database system (for example, a data warehouse) external to the system 100 and accessible by components of the system 100 over one or more wired or wireless networks. In other configurations, all or part of the database 118 may be locally stored at the PSAP 102. The caller profiles stored in the database 118, described in greater detail below with respect to FIG. 3, contain emergency information associated with respective registered users that may aid a call-taker of a PSAP (e.g., the call-taker/dispatcher 108), a dispatcher of the PSAP 102, and/or a first responder dispatched by the PSAP 102 in responding to the emergency incident for which the caller 114 is calling.

The database 118, responsive to receiving a request, or query, from the call analyzer device 110, provides the contents of a particular user profile (e.g., the user profile associated with the caller 114) or a subset of the contents of the particular user profile to the call analyzer device 110. For example, in response to the caller 114 contacting the PSAP 102, the call analyzer device 110 may identify the caller 114 according to a phone number of the caller 114, a caller ID of the caller 114, and/or a name or other identification of the caller 114 (e.g., as indicated by the caller during the call). Based on the determined identification of the caller 114 (e.g., the caller's phone number), the call analyzer device 110 performs a lookup in the database 118 to access the user profile associated with the caller 114.

The call-taker/dispatcher 108 further interacts with the call-taking/dispatching terminal 106 to dispatch one or more responding officer(s) 122 to respond to the emergency incident for which the caller 114 is calling. For example, call-taker/dispatcher 108 inputs information identifying the types and number of responding officer(s) 122 to be dispatched. The call-taking/dispatching terminal 106 provides this information to the dispatch system 120, which then sends a dispatch alert to the mobile device(s) 124 of the responding officer(s) 122 via the communication network(s) 112. The dispatch alert may include information about the incident, such as the incident location, incident type, and identifying information of the caller 114.

The dispatch system 120 routes information between the call-taking/dispatching terminal 106 and the mobile device (s) 124 of the responding officer(s) 122 over the communication network(s) 112. In some examples, the routed information includes voice communications between the responding officer(s) 122 and the call-taker/dispatcher 108. In this regard, the mobile device(s) 124 may include a land mobile radio, and the dispatch system 120, the communication network(s) 112, and the mobile device(s) 124 may operate according to a land mobile radio protocol, such as the Project 25 (P25) standard developed by the Association of Public-Safety Communications Officials (APCO), the Terrestrial Trunked Radio (TETRA) specification, the Digital Mobile Radio (DMR) standard, the Next Generation Digital Narrowband (NXDN) standard, the Digital Private Mobile Radio (dPMR) standard, and/or the OpenSky standard.

The information routed between the call-taking/dispatching terminal 106 and the mobile device(s) 124 of the responding officer(s) 122 over the communication network (s) 112 may take various other forms as well. For instance, the mobile device(s) 124 can include a media capture device, such as a microphone and/or camera (e.g., body-worn camera) configured to capture audio and/or of the surroundings of the responding officer(s) 122. In this regard, the mobile device(s) 124 may capture audio and/or video of interactions between the responding officer(s) 122 and the caller 114 or any other individual at the incident scene. To provide this captured data to the PSAP 102, the dispatch system 120, the communication network(s) 112, and the mobile device(s) 124 may operate according to a broadband wireless link protocol suitable for transmitting this audio and/or video data, such as the Institute of Electrical and Electronics Engineers (IEEE) 802.11 standard (Wi-Fi), the IEEE 802.16 standard (WiMAX), the Long Term Evolution (LTE) standard, the 5G New Radio (NR) standard, the Code Division Multiple Access 2000 (CDMA2000) standard, the Evolved Packet Core (EPC) standard, and/or one or more satellite broadband protocols.

The dispatch system 120 provides the information routed between the call-taking/dispatching terminal 106 and the mobile device(s) 124 of the responding officer(s) 122 to the call analyzer device 110, and the call analyzer device 110 uses this information to assist in updating an emergency user profile, as explained in further detail below.

Figure 2:
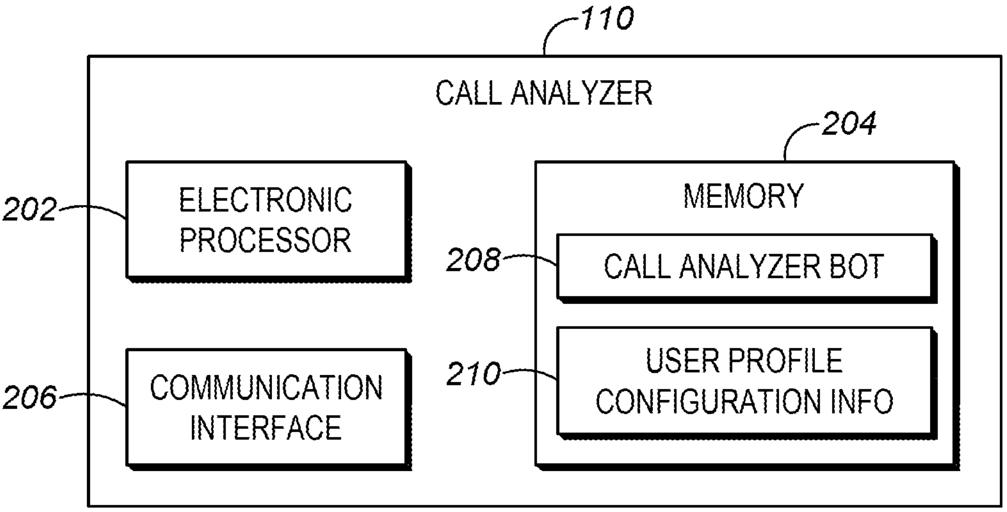
FIG. 2 illustrates a call analyzer device, according to some examples.

FIG. 2 schematically illustrates one example of the call analyzer device 110. In the example illustrated, the call analyzer device 110 includes an electronic processor 202 communicatively connected to a memory 204 and a communication interface 206. In some instances, the call analyzer device 110 is a computer server located on-premise of or remote from the PSAP 102. For example, some or all functionality of the call analyzer device 110 may be cloud implemented and accessible by the PSAP 102.

The electronic processor 202 includes suitable processing circuitry for performing the methods described herein or any combination of suitable processing circuitry. For example, the electronic processor 202 may include a digital signal processor (DSP), a graphics processing unit (GPU) embedded processor, a vision processing unit, etc. One or more circuit units included in the electronic processor 202 may operate independently or in parallel with one another.

The memory 204 may include read only memory (ROM), random access memory (RAM), other non-transitory computer-readable media, or a combination thereof. In the example shown, the memory 204 stores data and computer program instructions for performing, among other things, the methods described herein. For example, the memory 204 stores program data associated with a call analyzer bot 208 for performing speech recognition or otherwise generating transcripts of calls received by the PSAP 102 (e.g., using a natural language model or the like) and analyzing the content of the emergency calls. The call analyzer bot 208 may be implemented using, for example, one or more artificial intelligence (AI) models. The memory 204 may also store user profile configuration information 210 for providing a user interface to the caller 114 and/or other users of the system 100 to implement user profile configuration procedure prior to placement of a 9-1-1 call by the caller 114 and/or other users of the system 100. In some instances, the user profile configuration information 210 is stored in a memory separate from the call analyzer bot 208. For example, a first server or computing device may provide call analysis and call analyzer bot functionality, and a second server or computing device may provide a user interface for enabling a user to configure a user profile.

The communication interface 206 sends and receives communications to and from the call analyzer device 110 and other components of the system 100 (e.g., the database 118, the phone system 104, the call-taking/dispatching terminal 106, and/or the like).

Figure 3:
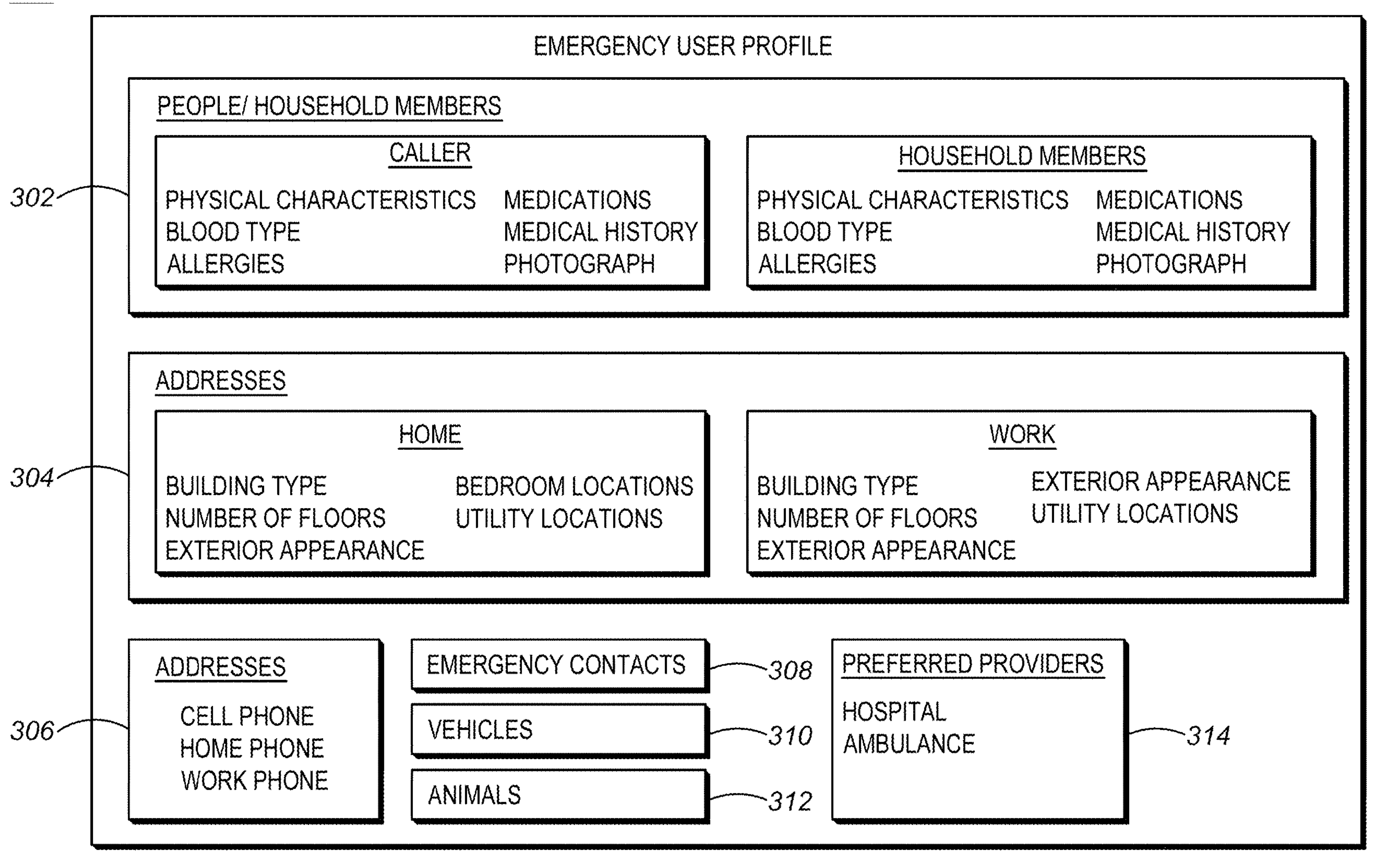
FIG. 3 illustrates an emergency user profile, according to some examples.

Referring now to FIG. 3, an example configured emergency user profile 300 is illustrated. The emergency user profile 300 includes a set of user data associated with and characterizing aspects of a respective registered user (e.g., the caller 114) that the call analyzer device 110 releases to the PSAP 102 (e.g., to a user interface of the call-taking/dispatching terminal 106) in response to the registered user placing an emergency call that is routed to the PSAP 102.

The set of user data contained in the user profile 300 may include, for example, information 302 about the caller 114 and any household members that live with the caller 114 such as information about their physical characteristics (e.g., hair color, eye color, height, weight, age), blood type, allergies, medications, medical history, and the like, and may also include a photograph of the caller 114 and any household members to aid in their identification by first responders. Further, the set of user data contained in the user profile 300 may include relevant building information 304, such as a home address, a work address, and characteristics of the identified buildings (e.g., number of floors, exterior color, location of bedrooms, and location of utilities such as electrical panel and water shutoff locations). Still further, the set of user data contained in the user profile 300 may include phone number information 306 (e.g., cell phone number, home phone number, and work phone number), emergency contact information 308, vehicle information 310 of the caller and any household members, animal information 312 (e.g., names, species, and physical characteristics of pets), and preferred provider information 314 (e.g., preferred hospital and ambulance services).

When the call analyzer device 110 determines, based on call information provided by the phone system 104, that a registered user having a configured emergency profile (e.g., caller 114) has placed an emergency call that is routed to the PSAP 102, the call analyzer device 110 responsively releases the set of user data contained in the user profile 300 to the PSAP 102 (e.g., to a user interface of the call-taking/dispatching terminal 106). For example, the user profile 300 may be stored in the caller profile database 118 in association with a phone number of the caller 114. When the caller 114 uses the associated phone number to place an emergency call that is routed to the PSAP 102, the phone system 104 provides the phone number to the call analyzer device 110, and the call analyzer device 110 queries the caller profile database 118 for the user profile 300 associated with the phone number. Upon identifying a user profile 300 associated with the phone number, the call analyzer device 110 provides the set of user data contained in the user profile 300 to the call-taking/dispatching terminal 106 for presentation to the call-taker/dispatcher 108. In this way, without having to manually direct a series of questions to the caller 114, the call-taker/dispatcher 108 automatically receives information about the caller 114 that the call-taker/dispatcher 108 can use in determining whether and how to dispatch first responders to address the incident reported by the caller 114. This may result in a faster and more efficient dispatch, which may result in improved outcomes for the caller 114.

However, as noted above, in some instances, the user data characterizing the caller 114 and stored in database 118 in association with an emergency user profile 300 of the caller 114 may be out of date or otherwise inaccurate. In this situation, the call analyzer device 110 may access this inaccurate information when querying the caller profile database 118 for the user profile 300 and may therefore cause this inaccurate information to be presented to the call-taker/dispatcher 108. In some scenarios, the call-taker/dispatcher 108 may then need to manually identify which of the information in the user profile 300 is inaccurate by posing a series of questions to the caller 114 when handling the emergency call. Further, in some scenarios, the call-taker/dispatcher 108 may mistakenly rely on the inaccurate information and thereby make inaccurate decisions when dispatching responding officers 122 to the incident scene.

In order to provide improved outcomes for emergency callers, the present disclosure provides systems and methods for prompting updates to emergency user profiles for emergency callers with emergency user profiles that may be out of date. Examples are described in further detail below.

Figure 4:
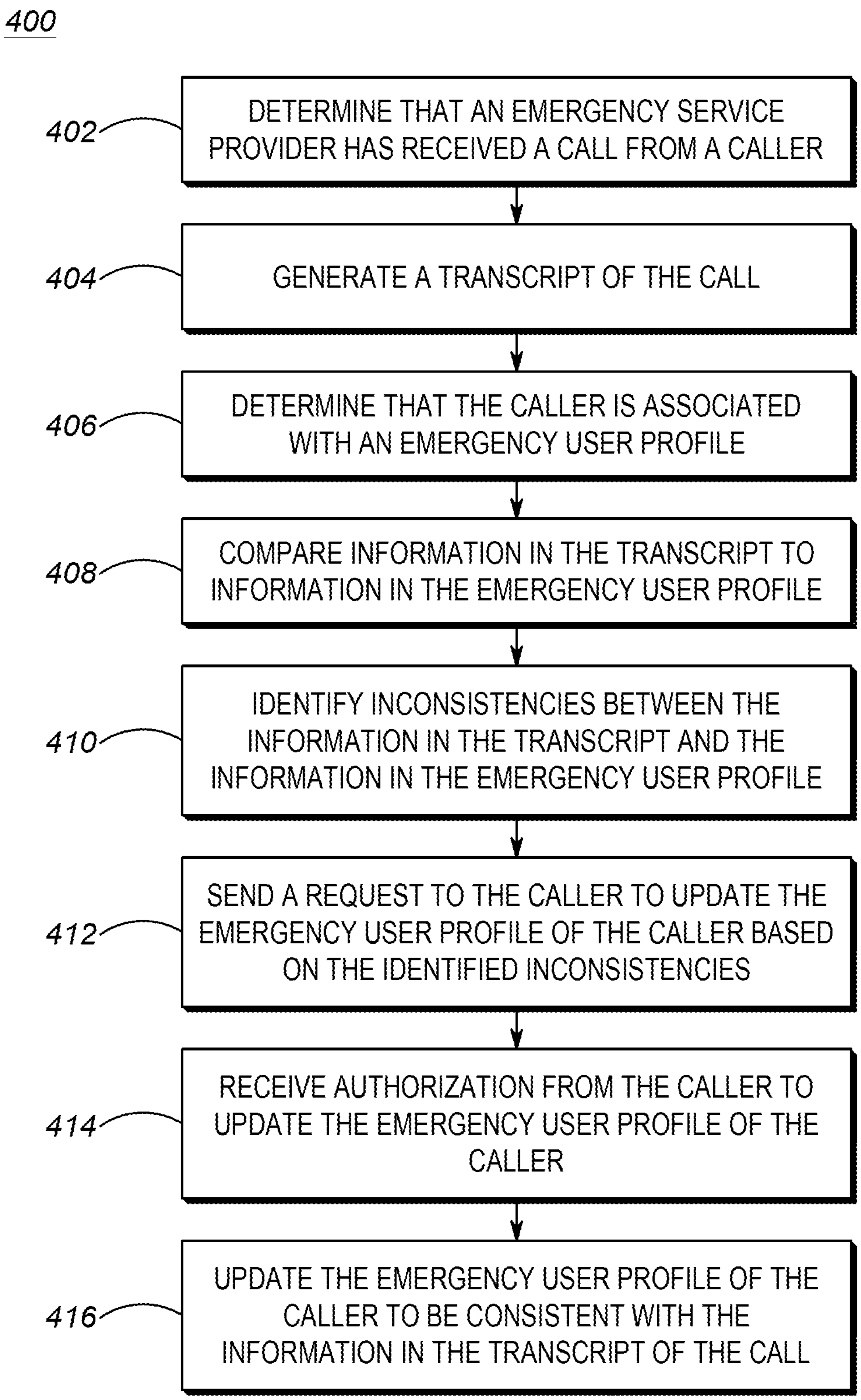
FIG. 4 illustrates a method for deriving updates to an emergency user profile from a transcript of an emergency call, according to some examples.

FIG. 4 illustrates an example method 400 implemented by the call analyzer device 110 (e.g., the electronic processor 202 of the call analyzer device 110). At block 402, the method 400 involves determining that an emergency service provider, such as the PSAP 102, has received a call from a communication device of a caller, such as communication device 116 of caller 114. As noted above, this may involve the call analyzer device 110 receiving call content and other information about the call from the phone system 104.

At block 404, the method 400 involves generating a transcript of the call. The call analyzer device 110 may generate the transcript of the call using any transcription techniques currently known or later developed. For example, the call analyzer device 110 may generate the transcript of the call using natural language processing techniques, such as by leveraging a machine learning model specially trained to convert speech to text. FIG. 5 depicts an example of such a generated transcript 500, which will be referred to again in further detail below.

At block 406, the method 400 involves determining that the caller is associated with an emergency user profile in an emergency service information system. In line with the discussion above, the emergency service information system stores user profiles containing different sets of user data characterizing different respective users, and the emergency service information system makes a given set of user data accessible to the emergency service provider based on the emergency service provider receiving a call from the respective user characterized by the given set of user data. One example of such an emergency service information system is the SMART911® service offered by Rave Mobile Safety.

In order to determine that the caller is associated with an emergency user profile in the emergency service information system, the call analyzer device 110 may query a database of the emergency service information system (e.g., caller profile database 118) for a user profile corresponding to a phone number of the caller's communication device. If the database returns a user profile in response to the query, then the call analyzer device 110 determines that the caller is associated with an emergency user profile in the emergency service information system.

At block 408, the call analyzer device 110 compares information in the transcript of the call to the information in the emergency user profile 300 of the caller 114. To do so, the call analyzer device 110 can determine a set of fillable fields for the user profile 300. For instance, in line with the discussion above in connection with FIG. 3, the call analyzer device 110 can determine that the user profile 300 includes a first fillable field corresponding to a name of the caller 114, a second fillable field corresponding to a home address of the caller 114, and so on for each separate data item included in the user profile 300. Additionally, the call analyzer device 110 parses the text in the generated transcript to determine the context of various terms and/or phrases in the transcript. Namely, the call analyzer device 110 can parse the text of the transcript to search for any of various contextual trigger conditions, where each of the contextual trigger conditions corresponds to one or more fillable fields of an emergency user profile. For example, because the emergency user profile 300 includes a fillable field corresponding to the caller's name, the analyzer device 110 can be configured to analyze the transcript 500 to detect a contextual trigger condition indicative of the caller's name. Likewise, the analyzer device 110 can be configured to analyze the transcript 500 to detect contextual trigger conditions corresponding to any or all other fillable fields in the emergency user profile 300. Using these techniques in connection with the example transcript 500 of FIG. 5, the call analyzer device 110 may determine that the caller's name is "Ming Huo," the caller's home address is "355 Main Street," and the caller has a household member named "Stephen Huo." And once the call analyzer device 110 has identified a particular term or phrase in the transcript that corresponds to a particular fillable field in the emergency user profile 300, the call analyzer device 110 compares the identified particular term or phrase in the transcript to any user data stored in association with particular fillable field in the emergency user profile 300.

The call analyzer device 110 can additionally or alternatively be configured to compare information from various other sources to the information in the emergency user profile 300 of the caller 114. As one example, the call analyzer device 110 can compare call information received from the phone system 104, such as a phone number of the caller 114, to the information in the emergency user profile 300. As another example, the call analyzer device 110 can be configured to compare information in transcripts of communications from one or more responding officers to the information in the emergency user profile 300. For instance, in line with the discussion above, the dispatch system 120 is configured to receive various communications from the mobile device(s) 124 of the responding officer(s) 122, such as audio communications between the responding officer(s) 122 and the call-taker/dispatcher 108 and/or between the responding officer(s) 122 and the caller 114 or other individuals at the incident scene. The dispatch system 120 can provide these communications to the call analyzer device 110, and the call analyzer device 110 can transcribe these communications and analyze the transcription for contextual trigger conditions in the same or similar manner as described above in connection with the call transcript 500.

At block 410, based on the comparison performed at block 408, the call analyzer device 110 identifies one or more inconsistencies between the information in the transcript and the information in the emergency user profile 300 of the caller 114. For instance, based on comparing a particular term or phrase in the transcript to the user data in a corresponding fillable field of the emergency user profile 300, the call analyzer device 110 can determine that the particular term or phrase in the transcript differs from the user data in the particular fillable field. The manner in which the call analyzer device 110 identifies the one or more inconsistencies may depend on the type of comparison technique employed at block 408. For example, when performing the comparison at block 408, the call analyzer device 110 may evaluate an edit distance to calculate the similarities between two strings, such as the similarities between a particular term or phrase in the transcript and the user data in a corresponding fillable field of the emergency user profile 300. Examples of edit distances the call analyzer device 110 can calculate include the Levenshtein distance, the longest common subsequence (LCS), the Hamming distance, the Damerau-Levenshtein distance, and the Jaro distance. Each of these techniques result in a numerical value quantifying the difference and/or similarity between the two strings, and the call analyzer device 110 can identify an inconsistency based on the calculated edit distance exceeding a threshold value. In the present example, the call analyzer device 110 determines that the home address identified in the transcript 500 (i.e., "355 Main Street") is inconsistent with the user data in the home address fillable field of the caller's emergency user profile 300.

At block 412, the call analyzer device 110 causes a request to be sent to the caller 114 (e.g., via the phone system 104) for authorizing the update to their emergency user profile 300 based on the inconsistencies identified at block 410, and the request can include an indication of the inconsistencies. In some examples, the request may take the form of a text message (e.g., SMS, MMS, or RCS) and may include a visual representation of the inconsistencies identified at block 410 or a selectable link (e.g., a URL) that causes the caller's communication device 116 to navigate to a web page displaying the inconsistencies identified at block 410.

Figure 6:
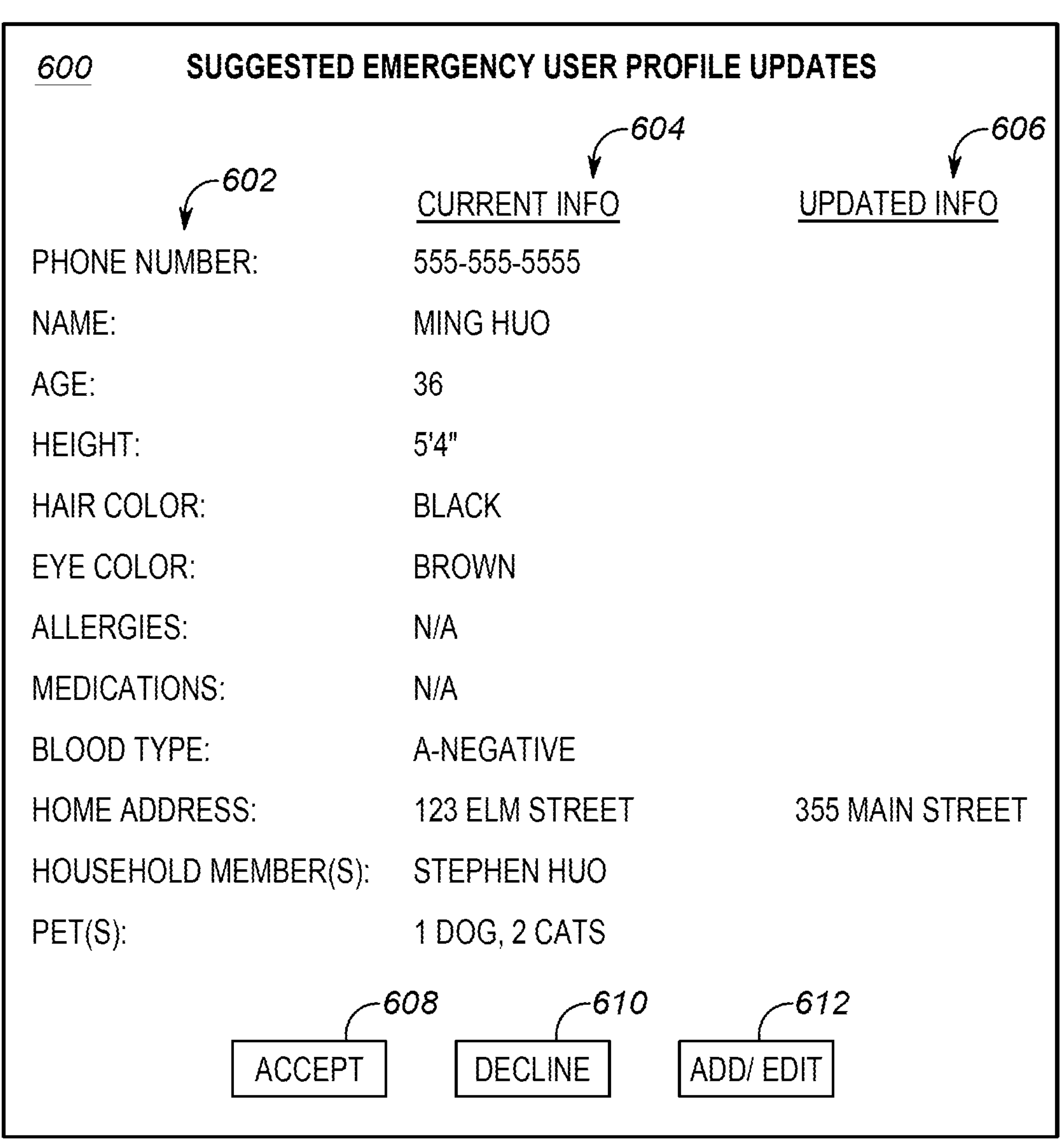
FIG. 6 illustrates information derived from the transcript of the emergency call for updating an emergency user profile, according to some examples.

FIG. 6 illustrates a simplified version of an example visual indication 600 of the inconsistencies identified at block 410 that the call analyzer device 110 can provide to the caller's communication device 116 at block 412. As shown, the indication 600 of the inconsistencies between the information in the transcript and the information in the emergency user profile 300 of the caller 114 can include an indication of the fillable fields 602 of the user profile 300, an indication of the current user data 604 corresponding to the fillable fields 602 and stored in association with the user profile 300, and an indication of suggested updated data 606 for the fillable fields 602. The suggested updated data 606 corresponds to the information identified in the transcript and/or other information sources associated with the emergency call that the call analyzer device 110 identified as inconsistent with the current user data 604 of the user profile 300 at block 410. For instance, as shown in FIG. 6, the The visual indication 600 can also include selectable buttons for authorizing or editing the suggested updated information for inclusion in the caller's emergency user profile. For example, the visual indication 600 can include an accept button 608, the selection of which causes a message to be sent to the call analyzer device 110 for authorizing the update of the caller's emergency user profile to be consistent with the suggested updated data 606 identified from the transcript at block 410. The visual indication 600 can further include a decline button 610, the selection of which causes a message to be sent to the call analyzer device 110 for declining authorization for updating the caller's emergency user profile with the suggested updated data 606. And the visual indication 600 can include an add/edit button 612, the selection of which allows the caller to add/or edit the current user data 604 and/or the suggested updated data 606 corresponding to one or more of the fillable fields 602. Selection of the accept button 608 after adding or editing the current user data 604 and/or the suggested updated data 606 also causes the added and/or edited information to be sent to the call analyzer device 110 for inclusion in the updated emergency user profile.

While the visual indication 600 depicted in FIG. 6 is one example of how the inconsistencies identified at block 410 can be presented to the caller 114, the call analyzer device 110 can present this information in various other ways as well. In some examples, the call analyzer device 110 can send a copy of the transcript 500 to the caller's communication device 116 and/or a copy of the transcript of any responding officer communications that were used to identify potential inaccuracies in the caller's emergency user profile, with the copy of the transcript having the identified inconsistencies formatted differently from any remaining transcript text to visually distinguish the identified inconsistencies from the remaining transcript text. For instance, the call analyzer device 110 can highlight, italicize, bold, colorize, and/or annotate the inconsistent terms and/or phrases identified at block 410 in the copy of the transcript 500. Any other formatting techniques for distinguishing the identified information in the copy of the transcript 500 may be employed as well.

In some examples, the call analyzer device 110 can be configured to delay causing the request to be sent to the caller 114 at block 412 for authorizing the update to their emergency user profile 300, and the extent of the delay can depend on the nature of the emergency call. For example, when an emergency call requires an immediate response because there is reason to believe that there is an imminent threat to life or risk of substantial property loss or damage, there is a greater likelihood that the caller 114 will be preoccupied with the aftermath of the emergency incident and will be unable and/or unwilling to immediately give attention to a request for updating their emergency user profile. On the other hand, when an emergency call is connected to a more benign incident, then the caller 114 is more likely to be able and willing to immediately give attention to a request for updating their emergency user profile. As such, the call analyzer device 110 can be configured to determine a nature of the emergency call and select a time for causing the request to be sent to the caller 114 based on the determined nature of the call.

The call analyzer device 110 can determine the nature of the emergency call in various ways. As one example, the call analyzer device 110 can determine the nature of the emergency call based on an incident record created by the call-taker/dispatcher 108 using the call-taking/dispatching terminal 106. The incident record may include various information about the emergency call, such as the type of emergency incident, the dispatched units to the incident, and a description of the incident. Based on this information, the call analyzer device 110 can infer whether the emergency call is a high priority call, a medium priority call, or a low priority call. A high priority call can be a call that requires an immediate response and that is associated with an imminent threat to life and/or a risk of substantial property loss or damage. A medium priority call can be a call that requires an immediate response but presents no significant threat to life or risk of substantial property loss or damage. All other calls can be low priority calls. With this framework, the call analyzer device 110 can be configured to delay the request at block 412 the longest for high priority calls (e.g., 3-5 days), a shorter time period for medium priority calls (e.g., 24 hours), and the shortest time for low priority calls (e.g., no delay). However, it should be understood that these examples of priority assessments and their corresponding delays are for illustrative purposes only and, in other examples, the call analyzer device 110 can apply different delays using different metrics.

At block 414, the call analyzer device 110 receives a message indicating that the caller 114 has authorized the update of the emergency user profile. For instance, the call analyzer device 110 can receive an authorization message along with any additional or edited information from the caller's communication device 116 (e.g., via the phone system 104) in response to the caller 114 selecting the accept button 608.

At block 416, in response to receiving the authorization, the call analyzer device 110 updates the emergency user profile to be consistent with the information in the terms and/or phrases identified as inconsistent at block 410 and/or to be consistent with any additional or edited information received from the caller at block 414. Namely, the call analyzer device 110 updates the caller's emergency user profile in the caller profile database 118 by storing the information authorized at block 414 in association with the user profile. In this manner, the next time the caller 114 places an emergency call that is routed to the PSAP 102, the new up-to-date information stored in the created emergency user profile can be automatically provided to the call-taker/dispatcher 108 in the manner described above, thereby reducing the amount of time spent by the call-taker/dispatcher 108 in obtaining accurate information from the caller and allowing the call-taker/dispatcher 108 to more efficiently address the emergency incident.

In some examples of the method 400, the transcript 500, or any other information source used to derive updates to an emergency user profile, may include information about an individual different from the caller 114, such as a victim of the incident for which the caller 114 is calling, or some other person discussed by the caller 114 and therefore identified by the transcript 500. In such a scenario, the call analyzer 110 may perform similar actions depicted in the method 400 in connection with this other individual. For instance, the call analyzer 110 may determine that the individual is associated with an emergency user profile in the caller profile database 118 (e.g., by searching the database 118 for the information of the individual identified in the transcript 500 and locating a corresponding data record), and the call analyzer device 110 can compare information in the transcript 500 about the individual to identify inconsistencies with information in the individual's emergency user profile. The call analyzer device 110 can responsively send a request to a communication device of this different individual for authorizing the update of their emergency user profile to be consistent with the information identified in the transcript 500. However, because this other individual did not place the emergency call using their own communication device, the call analyzer device 110 may need to take additional steps to first identify the communication device of this other individual. For example, the call analyzer device 110 can send a message to the caller's communication device 116 requesting additional information about the other individual, such as the other individual's telephone number. Upon receiving the other individual's telephone number, the call analyzer device 110 can proceed with method 400 as described above and below to create an emergency user profile for this other individual.

In the foregoing specification, various examples have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if examples described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some examples may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an example can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various examples may be written in an object oriented programming language such as Java, Smalltalk, C++, Python, or the like. However, the computer program code for carrying out operations of various examples may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The terms "substantially," "essentially," "approximately," "about" or any other version thereof, are defined as being close to as understood by one of ordinary skill in the art, and in one non-limiting example the term is defined to be within 10%, in another example within 5%, in another example within 1% and in another example within 0.5%. The term "one of," without a more limiting modifier such as "only one of," and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled," "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A computing device comprising:

at least one processor; and a non-transitory computer-readable storage medium comprising program instructions that, when executed by the at least one processor, cause the computing device to perform a set of operations comprising:

determining that an emergency service provider has received a call from a communication device of a caller;

generating a transcript of the received call;

determining that the caller is associated with a user profile in an emergency service information system, wherein the user profile comprises user data characterizing the caller, and wherein the user data becomes accessible to the emergency service provider based on the emergency service provider receiving the call from the communication device of the caller;

comparing information in the transcript of the received call to the user data characterizing the caller in the emergency information system;

based on the comparison, identifying one or more inconsistencies between the information in the transcript and the user data characterizing the user in the emergency information system;

sending, to the communication device of the caller, a request to update the user profile associated with the caller in the emergency information system, the request including an indication of the identified one or more inconsistencies;

receiving, from the communication device of the caller, an authorization to update the user profile associated with the caller in the emergency information system; and updating the user data characterizing the caller in the emergency information system to be consistent with the information in the transcript of the received call.

2. The computing device of claim 1, wherein comparing information in the transcript of the received call to the user data characterizing the caller in the emergency information system comprises:

determining a set of fillable fields for a user profile in the emergency information system;

determining, based on a context of a particular term or phrase in the transcript, that the particular or term or phrase corresponds to a particular fillable field of the set of fillable fields; and responsively comparing the particular term or phrase in the transcript to the user data in the particular fillable field.

3. The computing device of claim 2, wherein identifying one or more inconsistencies between the information in the transcript and the user data characterizing the user in the emergency information system comprises:

determining that the particular term or phrase in the transcript differs from the user data in the particular fillable field.

4. The computing device of claim 2, wherein the indication of the identified one or more inconsistencies comprises an indication of the particular fillable field and the particular term or phrase in the transcript.

5. The computing device of claim 1, wherein the indication of the identified one or more inconsistencies comprises a copy of the transcript having the identified one or more inconsistencies in the transcript formatted differently from any remaining transcript text to visually distinguish the identified one or more inconsistencies from the remaining transcript text.

6. The computing device of claim 1, the set of operations further comprising:

obtaining a transcript of communications by a responding officer dispatched in response to the received call;

identifying, from the transcript of communications by the responding officer, an additional one or more inconsistencies between information in the transcript of communications by the responding officer and the user data characterizing the user in the emergency information system, wherein the request to create the user profile of the caller further includes an indication of the additional one or more inconsistencies; and updating the user data characterizing the caller in the emergency information system to be consistent with the information in the transcript of communications by the responding officer.

7. The computing device of claim 1, the set of operations further comprising:

identifying, from the transcript of the received call, information about an individual different from the caller;

determining, based on the identified information of the different individual, that the different individual is associated with a different user profile comprising user data characterizing the different individual in the emergency service information system;

comparing information in the transcript of the received call to the user data characterizing the different individual in the emergency information system;

based on the comparison, identifying one or more inconsistencies between the information in the transcript and the user data characterizing the different individual in the emergency information system;

determining a communication device of the different individual; and sending, to the communication device of the different individual, a request to update the user profile associated with the different individual in the emergency information system, the request including an indication of the identified one or more inconsistencies between the information in the transcript and the user data characterizing the different individual in the emergency information system.

8. The computing device of claim 7, wherein determining the communication device of the different individual comprises:

sending, to the communication device of the caller, a request for information identifying the communication device of the different individual; and receiving, from the communication device of the caller, information identifying the communication device of the different individual.

9. The computing device of claim 1, wherein sending the request to update the user profile associated with the caller in the emergency information system comprises:

determining a priority level associated with the received call; and delaying sending the request to update the user profile by a particular amount of time, wherein the particular amount of time depends on the priority level associated with the received call.

10. A method comprising:

determining that an emergency service provider has received a call from a communication device of a caller;

generating a transcript of the received call;

determining that the caller is associated with a user profile in an emergency service information system, wherein the user profile comprises user data characterizing the caller, and wherein the user data becomes accessible to the emergency service provider based on the emergency service provider receiving the call from the communication device of the caller;

comparing information in the transcript of the received call to the user data characterizing the caller in the emergency information system;

based on the comparison, identifying one or more inconsistencies between the information in the transcript and the user data characterizing the user in the emergency information system;

sending, to the communication device of the caller, a request to update the user profile associated with the caller in the emergency information system, the request including an indication of the identified one or more inconsistencies;

receiving, from the communication device of the caller, an authorization to update the user profile associated with the caller in the emergency information system; and updating the user data characterizing the caller in the emergency information system to be consistent with the information in the transcript of the received call.

11. The method of claim 10, wherein comparing information in the transcript of the received call to the user data characterizing the caller in the emergency information system comprises:

determining a set of fillable fields for a user profile in the emergency information system;

determining, based on a context of a particular term or phrase in the transcript, that the particular or term or phrase corresponds to a particular fillable field of the set of fillable fields; and responsively comparing the particular term or phrase in the transcript to the user data in the particular fillable field.

12. The method of claim 11, wherein identifying one or more inconsistencies between the information in the transcript and the user data characterizing the user in the emergency information system comprises:

determining that the particular term or phrase in the transcript differs from the user data in the particular fillable field.

13. The method of claim 11, wherein the indication of the identified one or more inconsistencies comprises an indication of the particular fillable field and the particular term or phrase in the transcript.

14. The method of claim 10, wherein the indication of the identified one or more inconsistencies comprises a copy of the transcript having the identified one or more inconsistencies in the transcript formatted differently from any remaining transcript text to visually distinguish the identified one or more inconsistencies from the remaining transcript text.

15. The method of claim 10, further comprising:

obtaining a transcript of communications by a responding officer dispatched in response to the received call;

identifying, from the transcript of communications by the responding officer, an additional one or more inconsistencies between information in the transcript of communications by the responding officer and the user data characterizing the user in the emergency information system, wherein the request to create the user profile of the caller further includes an indication of the additional one or more inconsistencies; and updating the user data characterizing the caller in the emergency information system to be consistent with the information in the transcript of communications by the responding officer.

16. A non-transitory computer-readable storage medium comprising program instructions that, when executed by at least one processor, cause a computing device to perform a set of operations comprising:

determining that an emergency service provider has received a call from a communication device of a caller;

generating a transcript of the received call;

determining that the caller is associated with a user profile in an emergency service information system, wherein the user profile comprises user data characterizing the caller, and wherein the user data becomes accessible to the emergency service provider based on the emergency service provider receiving the call from the communication device of the caller;

comparing information in the transcript of the received call to the user data characterizing the caller in the emergency information system;

based on the comparison, identifying one or more inconsistencies between the information in the transcript and the user data characterizing the user in the emergency information system;

sending, to the communication device of the caller, a request to update the user profile associated with the caller in the emergency information system, the request including an indication of the identified one or more inconsistencies;

receiving, from the communication device of the caller, an authorization to update the user profile associated with the caller in the emergency information system; and updating the user data characterizing the caller in the emergency information system to be consistent with the information in the transcript of the received call.

17. The non-transitory computer-readable storage medium of claim 16, wherein comparing information in the transcript of the received call to the user data characterizing the caller in the emergency information system comprises:

determining a set of fillable fields for a user profile in the emergency information system;

determining, based on a context of a particular term or phrase in the transcript, that the particular or term or phrase corresponds to a particular fillable field of the set of fillable fields; and responsively comparing the particular term or phrase in the transcript to the user data in the particular fillable field.

18. The non-transitory computer-readable storage medium of claim 17, wherein identifying one or more inconsistencies between the information in the transcript and the user data characterizing the user in the emergency information system comprises:

determining that the particular term or phrase in the transcript differs from the user data in the particular fillable field.

19. The non-transitory computer-readable storage medium of claim 17, wherein the indication of the identified one or more inconsistencies comprises an indication of the particular fillable field and the particular term or phrase in the transcript.

20. The non-transitory computer-readable storage medium of claim 16, wherein the indication of the identified one or more inconsistencies comprises a copy of the transcript having the identified one or more inconsistencies in the transcript formatted differently from any remaining transcript text to visually distinguish the identified one or more inconsistencies from the remaining transcript text.

* * * * *